United States Patent
Alakuijala et al.

(10) Patent No.: US 10,735,754 B2
(45) Date of Patent: Aug. 4, 2020

(54) CHROMATIC ABERRATION MODELING IN IMAGE COMPRESSION AND ENHANCEMENT

(71) Applicant: Google Inc., Mountain View, CA (US)

(72) Inventors: Jyrki Alakuijala, Wollerau (CH); Zoltan Szabadka, Wollerau (CH)

(73) Assignee: GOOGLE LLC, Mountain View, CA (US)

(*) Notice: Subject to any disclaimer, the term of this patent is extended or adjusted under 35 U.S.C. 154(b) by 36 days.

(21) Appl. No.: 15/498,017

(22) Filed: Apr. 26, 2017

(65) Prior Publication Data

US 2018/0316927 A1    Nov. 1, 2018

(51) Int. Cl.
*H04N 19/426* (2014.01)
*G06T 5/00* (2006.01)
(Continued)

(52) U.S. Cl.
CPC ............ *H04N 19/426* (2014.11); *G06T 5/00* (2013.01); *G06T 7/90* (2017.01); *H04N 9/045* (2013.01); *H04N 9/646* (2013.01); *H04N 19/14* (2014.11); *H04N 19/186* (2014.11); *H04N 19/42* (2014.11); *H04N 19/85* (2014.11)

(58) Field of Classification Search
CPC ............ H04N 19/426; G06T 7/90; G06T 5/00
See application file for complete search history.

(56) References Cited

U.S. PATENT DOCUMENTS

| | | | |
|---|---|---|---|
| 7,706,608 B2 | 4/2010 | Sawada | |
| 2005/0141773 A1 | 6/2005 | Mizuno | |

(Continued)

FOREIGN PATENT DOCUMENTS

| | | | | |
|---|---|---|---|---|
| EP | 1592233 A1 | 11/2005 | | |
| JP | 2013017142 A | * | 1/2013 | ............ H04N 9/045 |
| WO | 2011097038 A1 | 8/2011 | | |

OTHER PUBLICATIONS

International Search Report and Written Opinion for Application No. PCT/US2018/029330, dated Aug. 14, 2018, 20 pages.

*Primary Examiner* — Pinalben Patel
(74) *Attorney, Agent, or Firm* — Brake Hughes Bellermann LLP (57) ABSTRACT

Techniques of compressing color images in the presence of chromatic aberrations involve performing, prior to compression, a chromatic aberration correction operation on a color image. Along these lines, the chromatic aberration of an imaging system may be represented as a vector displacement map between a red channel and a green channel of a color image, a blue channel and a green channel of the color image, or both. In some implementations, prior to adding the vector displacements to each of the images of the red channel and the blue channel, these displacements are weighted according to proximity from an edge of each of the respective red and blue images. In some further implementations, the vector displacement maps as well as the weights are blurred with a blurring kernel such as a gaussian. Once these vector displacements are added to each of the red and blue images, the resulting color images are linearly combined to produce a new brightness channel Y. This new brightness channel Y is compressed to form the compressed color image.

20 Claims, 7 Drawing Sheets

(51) Int. Cl.
*G06T 7/90* (2017.01)
*H04N 19/42* (2014.01)
*H04N 9/64* (2006.01)
*H04N 19/85* (2014.01)
*H04N 19/14* (2014.01)
*H04N 19/186* (2014.01)
*H04N 9/04* (2006.01)

(56) References Cited

U.S. PATENT DOCUMENTS

| | | |
|---|---|---|
| 2006/0159357 A1 | 7/2006 | Mizuno |
| 2007/0140569 A1* | 6/2007 | Tabuchi ............ H04N 19/117 382/232 |
| 2011/0090967 A1 | 4/2011 | Chen et al. |
| 2011/0211752 A1* | 9/2011 | Grafulla-Gonzalez .................. H04N 9/045 382/162 |
| 2012/0212644 A1* | 8/2012 | Nashizawa ............ G06T 5/006 348/223.1 |
| 2013/0010163 A1* | 1/2013 | Yamaguchi ............ H04N 9/045 348/242 |
| 2015/0286887 A1* | 10/2015 | Dave ................. G02B 27/0025 382/275 |
| 2016/0379064 A1* | 12/2016 | van Beek ........... G06K 9/00798 382/104 |

* cited by examiner

CHROMATIC ABERRATION MODELING IN IMAGE COMPRESSION AND ENHANCEMENT

TECHNICAL FIELD

This description relates to color image compression.

BACKGROUND

In color image processing, color images may be compressed by transforming an RGB representation into a YUV representation, where the Y channel is an intensity expressed as a linear combination of the three color channels and the U and V channels are respective differences between the R and B channels with the Y channel. When the color channels are largely correlated, the Y channel may be sufficient to describe the image and this channel alone may be compressed.

SUMMARY

In one general aspect, a method can include receiving, by image processing circuitry configured to compress color image data, color image data representing a color image from an imaging system having chromatic aberration, the color image including a first color channel and a second color channel, the first color channel forming a first image and the second color channel forming a second image, the chromatic aberration producing a separation between an edge of the first image and an edge of the second image. The method can also include performing, by the image processing circuitry, a chromatic aberration correction operation on the color image data to produce corrected color image data representing a corrected color image, the chromatic aberration correction operation being based on the chromatic aberration of the imaging system, the corrected color image having a reduced separation between the edge of the first image and the edge of the second image. The method can further include performing, by the image processing circuitry, an image compression operation on the corrected color image data to produce compressed color image data, the compressed color image data having fewer bits of information than the corrected color image data.

The details of one or more implementations are set forth in the accompanying drawings and the description below. Other features will be apparent from the description and drawings, and from the claims.

DETAILED DESCRIPTION

In color image processing, color images may be compressed by transforming an RGB representation into a YUV representation, where the Y channel is an intensity expressed as a linear combination of the three color channels and the U and V channels are respective differences between the R and B channels with the Y channel. When the color channels are largely correlated, the Y channel may be sufficient to describe the image and this channel alone may be compressed.

Nevertheless, some color images may suffer from chromatic aberration as a result of the imaging system used to construct the color images. The effect of such aberrations is to cause correlations between the color channels to be largely lost. In such a case, a conventional approach to processing color images in the presence of chromatic aberrations is to compress each color channel (R,G,B) separately rather than as a single linear combination. The conventional approaches to conflict resolution apply to two-dimensional environments in which a user is not immersed, e.g., collaborative word-processing software. In three-dimensional immersive environments such as virtual reality ("VR"), however, the conventional approaches to conflict resolution may cause the users discomfort and/or break the immersion in their respective environments.

Nevertheless, in the above-described conventional approach to compressing color images in the presence of chromatic aberrations, there is at least a factor of 9 increase in storage occupied by the image data when each RGB channel is compressed rather than the Y channel. A reason for this vast increase in resource consumption is that, for each color channel, there are three effective color channels resulting from the color-dependent image shifts due to the chromatic aberrations.

In accordance with the implementations described herein, improved techniques of compressing color images in the presence of chromatic aberrations involve performing, prior to compression, a chromatic aberration correction operation on a color image. Along these lines, the chromatic aberration of an imaging system may be represented as a vector displacement map between a red channel and a green channel of a color image, a blue channel and a green channel of the color image, or both. In some implementations, prior to adding the vector displacements to each of the images of the red channel and the blue channel, these displacements are weighted according to proximity from an edge of each of the respective red and blue images. In some further implementations, the vector displacement maps as well as the weights are blurred with a blurring kernel such as a gaussian. Once these vector displacements are added to each of the red and blue images, the resulting color images are linearly combined to produce a new brightness channel Y. This new brightness channel Y is compressed to form the compressed color image. By removing the chromatic aberration and restoring the color channel correlations at least partially, the storage efficiencies of the YUV representation of a color image may be achieved.

Figure 1:
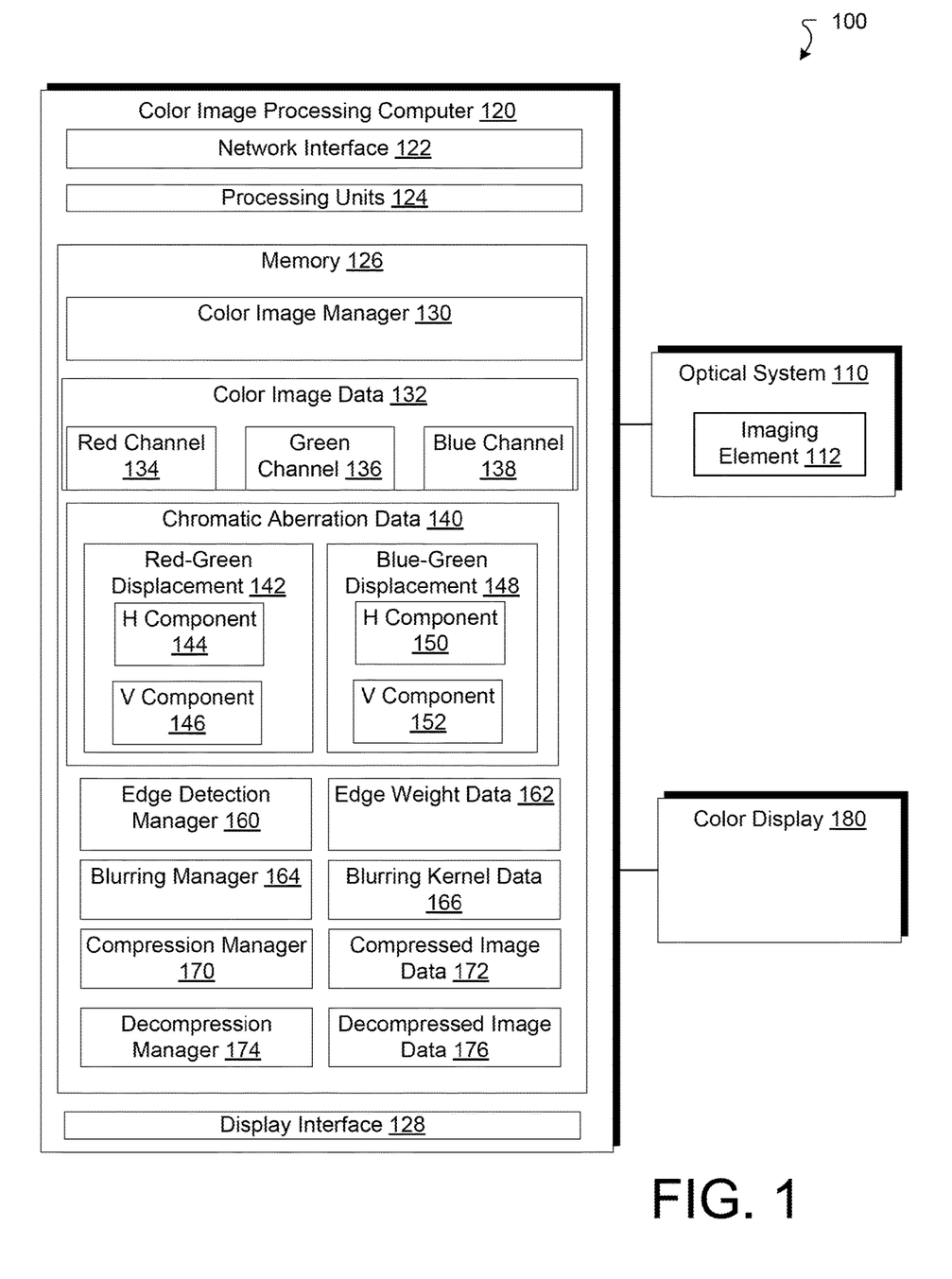
FIG. 1 is a diagram that illustrates an example electronic environment in which improved techniques described herein may be implemented.

FIG. 1 is a diagram that illustrates an example electronic environment 100 in which the above-described improved techniques may be implemented. As shown, in FIG. 1, the electronic environment 100 includes an optical system 110 that produces a color image. The electronic environment 100 also includes a color image processing computer 120 and a color display 180.

The optical system 110 may take the form of a digital camera, although other optical systems such as a film camera, a video camera, or any such system capable of producing a color image may be considered. Such optical systems include one or more optical elements that produce a sharp image of objects across a specified image field. When the optical elements refract light, it is likely that these elements also introduce some chromatic aberration into the optical system 110. In most such systems, the optical elements can be designed to reduce such chromatic aberration (e.g., using cemented doublets). Nevertheless, some optical systems—and optical system 110 serves as an example of such a system—have some chromatic aberrations due to cost and/or space considerations.

The optical system 110 includes an imaging element 112 onto which images of objects are formed. In most implementations, the imaging element 112 includes a charged-coupled device (CCD) array. In such implementations, the resulting color image is made up of many pixels. Each of the pixels occupies a square or rectangular-shaped region and has a constant brightness for each of the color channels. In most implementations, the color channels are red (R), green (G), and blue (B) (RGB representation) but there are other channels stemming from other color representations (e.g., CYMK). In other implementations, the color image may be printed and then scanned to created pixelized color image data.

As described above, for reasonably good imaging, the color image may be accurately represented as having a single channel Y that is a linear combination of the three color channels R, G, and B. The reason for this is that the color channels correlate to a large degree so that predictions of color compositions of pixels based on color compositions of neighboring pixels is accurate in these cases. However, when there is chromatic aberration, each color channel contains content from other color channels. In this case, the correlation between the color channels breaks down and combining the channels into a single channel no longer provides an accurate representation of the color image. Nevertheless, rather than storing each color channel (and each channel within each color channel), the chromatic aberration in a color image may be corrected as described herein.

The color image processing computer 120 is configured to correct any chromatic aberration in color images and then compress the corrected image data. The color image processing computer 120 includes a network interface 122, one or more processing units 124, and memory 126. The network interface 122 includes, for example, Ethernet adaptors, Token Ring adaptors, and the like, for converting electronic and/or optical signals received from a network to electronic form for use by the color image processing computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the color image processing computer 120 can be, or can include processors (e.g., processing units 124) configured to process instructions stored in the memory 126. Examples of such instructions as depicted in FIG. 1 include a color image manager 130, an edge detection manager 160, a blurring manager 164, a compression manager 170, and a decompression manager 174. Further, as illustrated in FIG. 1, the memory 126 is configured to store various data, which is described with respect to the respective managers that use such data.

The color image manager 130 is configured to receive color image data 132, either directly through an electronic connection or indirectly through a user, from the optical system 110. For example, the optical system 110 may be connected to the color image processing computer 120 by a wired or wireless network connection, or over a remote connection through the Internet. Alternatively, the optical system 110 may write the color image data 132 to a local storage device, e.g., a flash drive or the like, and a user may load the color image data 132 into the memory 126 from the local storage device.

As described above, the color image data 132 may be represented as pixels arranged in an array, where each pixel occupies a square or rectangular region. As illustrated in FIG. 1, each pixel contains information about RGB color channels: a red channel 134, a green channel 136, and a blue channel 138. Each of the red 134, green 136, and blue 138 channels includes red, green, and blue color data because of chromatic aberration in the optical system 110.

The chromatic aberration in the optical system 110 is provided to the color imaging processing computer 120 in the form of chromatic aberration (CA) data 140. For example, it is known that axial chromatic aberration causes the focal length of the optical elements to change depending on wavelength, or color. Accordingly, red light may focus further away from a principal plane of the optical elements, followed by green light, and then blue light focusing closest. Accordingly, a color image may separate into three distinct, well-formed images. Along these lines, the color image data may then be represented as displacements between image edges. As illustrated in FIG. 1, the CA data 140 includes displacement vectors between red and green images 142 and displacement vectors between blue and green images 148. In some implementations, only the red-green displacements 142 are kept in memory 126 because there are no blue receptors used in discriminating fine accuracy in an image.

The displacements 142 and 148 are a characteristic of the optical system 110 and are independent of the color image data 132. Each of the displacements 142 and 148 provide a displacement value for each of a set of specified regions. In most implementations, the set of specified regions matches those regions defining pixels of the color image represented by the color image data 132 but this is by no means a requirement. Further, the red-green displacements 142 include a horizontal component 144 and vertical component 148, while the blue-green displacements include a horizontal component 150 and vertical component 152.

The edge detection manager 160 is configure to operate on the color image data 132 to locate edges of each of the red image, green image, and blue image. Accordingly, the edge detection manager 160 is also configured to generate edge weight data 162 based on a proximity of a pixel (i.e., a region in which a pixel is contained) to an edge. The edge weight data 162 then takes the form of floating point numbers over a grid of regions for each of the displacements 142 and 146.

The blurring manager 164 is configured to perform a convolution operation or a similar regularization operation on each of the horizontal displacement components 144 and 150 and the vertical displacement components 146 and 152. In some implementations, the blurring manager is also configured to perform the convolution operation on the edge weight data 162. The blurring manager 164 performs the convolution operation with blurring kernel data 166. For example, the blurring kernel data 166 may represent a gaussian blurring kernel of width 40 mm, 80 mm, or some other width that scales with image size.

In some implementations, the blurring manager 164 may convolve the displacement data 142 and 148 as well as the edge weight data 162 with the blurring kernel data. The color image processing computer 120 may then multiply then blurred edge weight data by the horizontal components 144 and 150 and the vertical components 146 and 152 to produce weighted, blurred displacements. The color image processing computer 120 may then add the weighted, blurred displacements to the color image data to produce corrected color image data.

In some implementations, the blurring manager 164 may perform other operations besides convolution with a linear blurring kernel as described above. For example, the blurring manager 164 may perform a nonlinear smoothing operation or other regularization on each of the horizontal displacement components 144 and 150 and the vertical displacement components 146 and 152 using running medians or similar operations that extract a smooth portion of the data. In another example, the blurring manager 164 may perform a model-fitting operation to estimate parameters of a specified model based on each of the horizontal displacement components 144 and 150 and the vertical displacement components 146 and 152.

The compression manager 170 is configured to perform a compression operation on corrected color image data to produce compressed image data 172. For example, the compression manager may perform a linear combination of the color channels of the corrected color image represented by the corrected color image data to produce a single color channel Y'. This single channel Y' provides a good representation of the color image because the chromatic aberration has been corrected. The compression manager 170 may then use a standard compression algorithm (e.g., JPEG) to produce compressed image data 172 that has fewer bytes of information than the corrected color image data.

The decompression manager 174 is configured to perform a decompression operation on the compressed image data 172 to produce decompressed image data 176. The decompressed image data 176 should be substantially the same as the corrected color image data. In this case, if it is desired to restore the original color image data, then the color image processing computer 120 may be configured to introduce the chromatic aberrations back into the corrected color image data to reproduce the original color image data 132.

The components (e.g., modules, processing units 124) of the color image processing computer 120 can be configured to operate based on one or more platforms (e.g., one or more similar or different platforms) that can include one or more types of hardware, software, firmware, operating systems, runtime libraries, and/or so forth. In some implementations, the components of the color image processing computer 120 can be configured to operate within a cluster of devices (e.g., a server farm). In such an implementation, the functionality and processing of the components of the Color image processing computer 120 can be distributed to several devices of the cluster of devices.

The components of the color image processing computer 120 can be, or can include, any type of hardware and/or software configured to process attributes. In some implementations, one or more portions of the components shown in the components of the color image processing computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the color image processing computer 120 can be, or can include, a software module configured for execution by at least one processor (not shown). In some implementations, the functionality of the components can be included in different modules and/or different components than those shown in FIG. 1.

Although not shown, in some implementations, the components of the user device 120 (or portions thereof) can be configured to operate within, for example, a data center (e.g., a cloud computing environment), a computer system, one or more server/host devices, and/or so forth. In some implementations, the components of the color image processing computer 120 (or portions thereof) can be configured to operate within a network. Thus, the components of the color image processing computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the color image processing computer 120 can be, or can include, processors configured to process instructions stored in a memory. For example, a color image manager 130 (and/or a portion thereof), an edge detection manager 160 (and/or a portion thereof), a blurring manager 164 (and/or a portion thereof), a compression manager 170 (and/or a portion thereof), and a decompression manager 174 (and/or a portion thereof) can be a combination of a processor and a memory configured to execute instructions related to a process to implement one or more functions.

Figure 2:
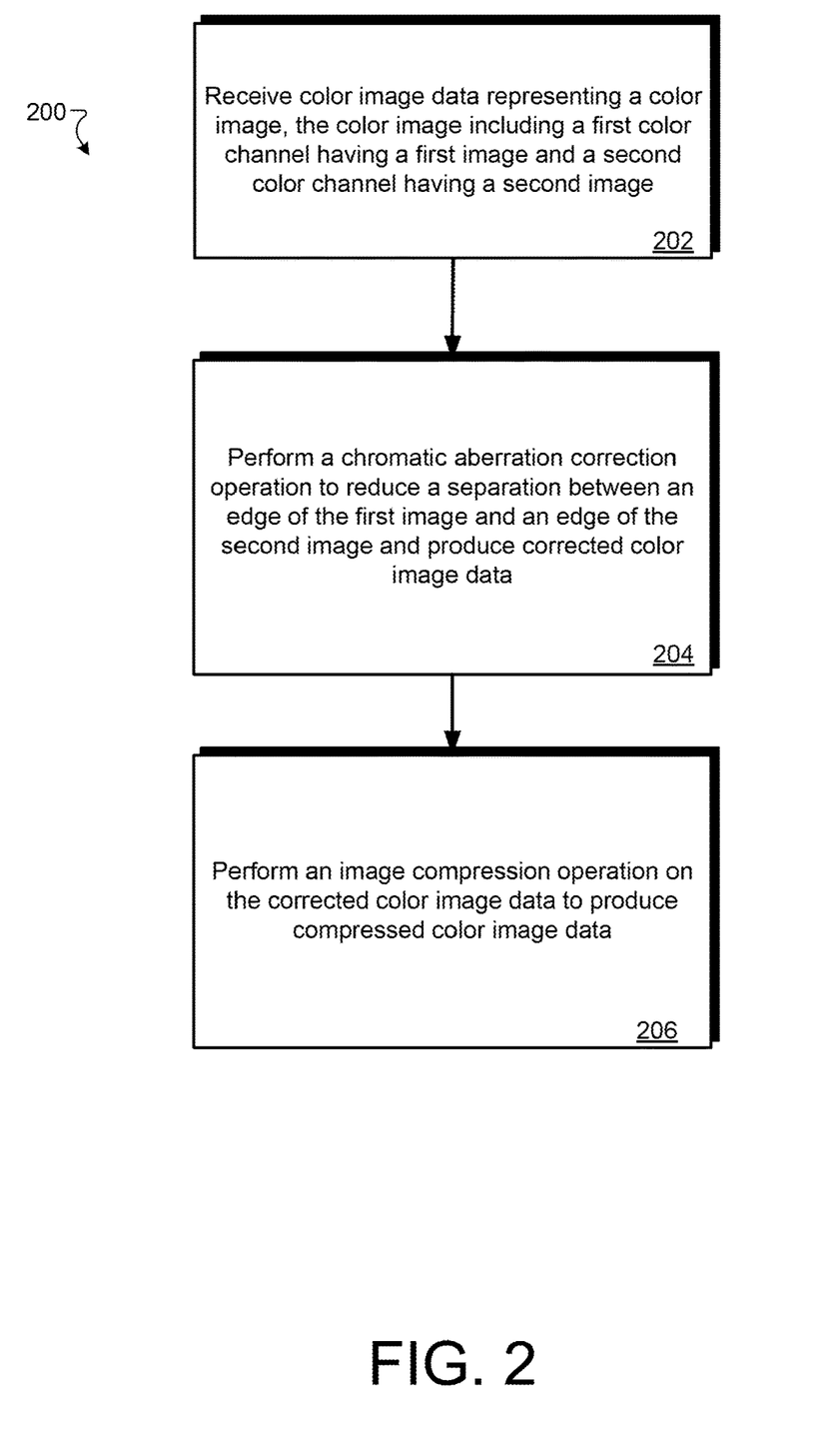
FIG. 2 is a flow chart that illustrates an example method of implementing the improved techniques as shown in FIG. 1.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the color image processing computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the color image processing computer 120. As illustrated in FIG. 2, the memory 126 is configured to store various data, including color image data 132, chromatic aberration data 140, edge weight data 162, and blurring kernel data 166.

FIG. 2 is a flow chart depicting an example method 200 of resolving conflicts within a virtual environment. The method 200 may be performed by software constructs described in connection with FIG. 1, which reside in memory 126 of the color image processing computer 120 and are run by the set of processing units 124.

At 202, the color image processing computer 120 receives color image data representing a color image from an imaging system having chromatic aberration. The color image includes a first color channel and a second color channel. The first color channel forms a first image and the second color channel forms a second image. The chromatic aberration produces a separation between an edge of the first image and an edge of the second image. For example, the first color channel may be the green channel, while the second color channel may be the red channel.

At 204, the color image processing computer 120 performs a chromatic aberration correction operation on the color image data to produce corrected color image data representing a corrected color image. The chromatic aberration correction operation is based on the chromatic aberration of the imaging system. The corrected color image has a reduced separation between the edge of the first image and the edge of the second image. For example, the chromatic aberration may be represented as a vector displacement between the edge of a green image and an edge of a red image.

At 206, the color image processing computer 120 performs an image compression operation on the corrected color image data to produce compressed color image data. The compressed color image data has fewer bits of information than the corrected color image data. Further, the corrected color image data may have only a single channel that is a linear combination of the color channels of the corrected image.

Figure 3A:
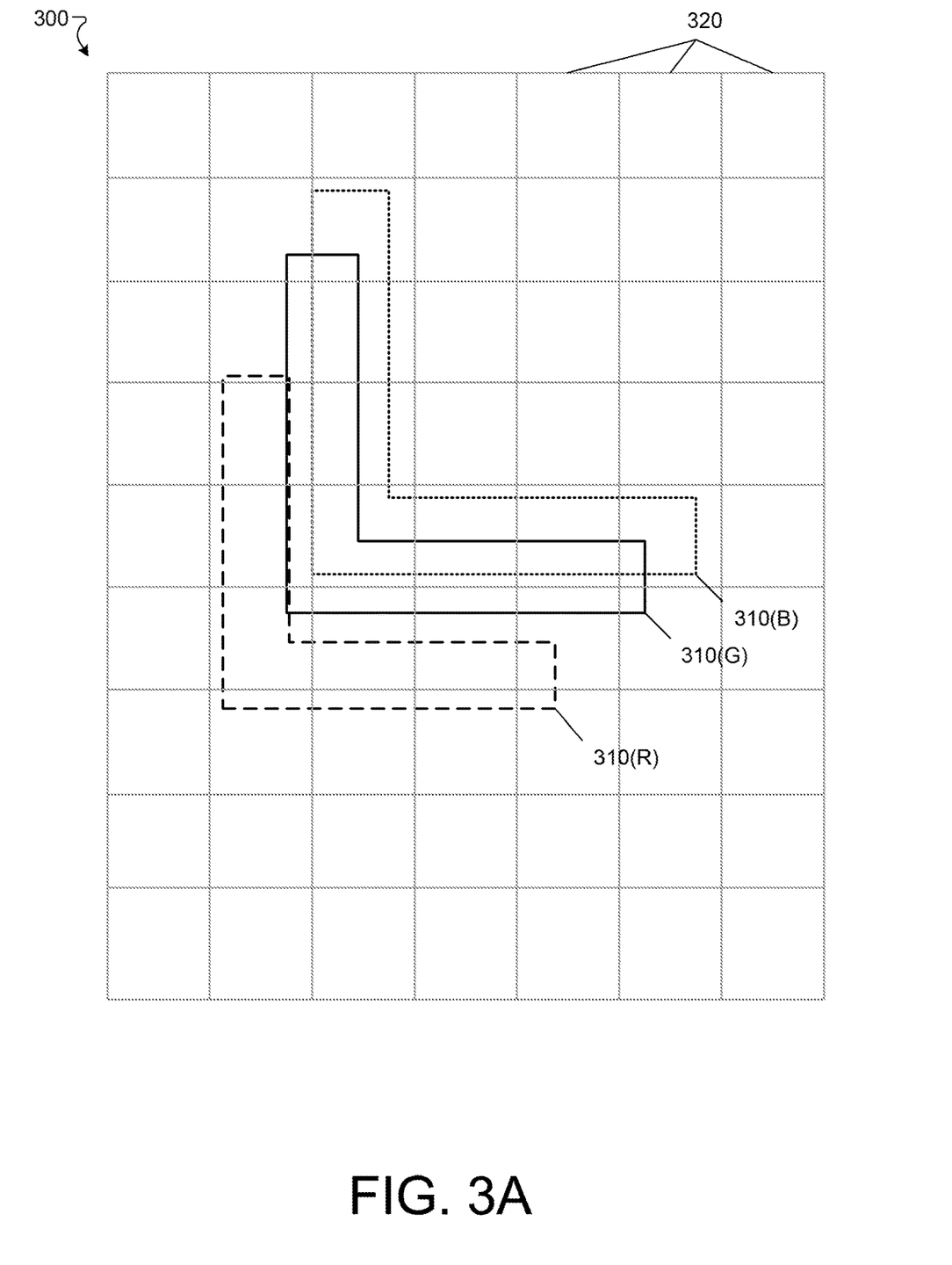
FIG. 3A is a diagram of an example color image with the R, G, and B images displaced prior to chromatic aberration correction according to the improved techniques shown in FIG. 1.

FIG. 3A is a diagram illustrating an example color image 300. As illustrated in FIG. 3A, the color image 300 represents an image of a white "L"-shaped object. The nominal image (i.e., that without chromatic aberration) is represented in the green channel as the green image 310(G) as a solid edge. The red image 310(R) is shown with a dashed edge and is displaced from the green image 310(G). Further, the red image 310(R) is also seen to be somewhat distorted in size—this too may be a possibility in some implementations when there is also transverse chromatic aberration present in the optical system 110 (FIG. 1). The blue image 310(B), having a dotted edge, is also displaced and distorted in size as illustrated in FIG. 3A.

The color image 300 is also illustrated in FIG. 3A to be broken up into square pixels 320. The color data has a single value per channel within a pixel 320.

Figure 3B:
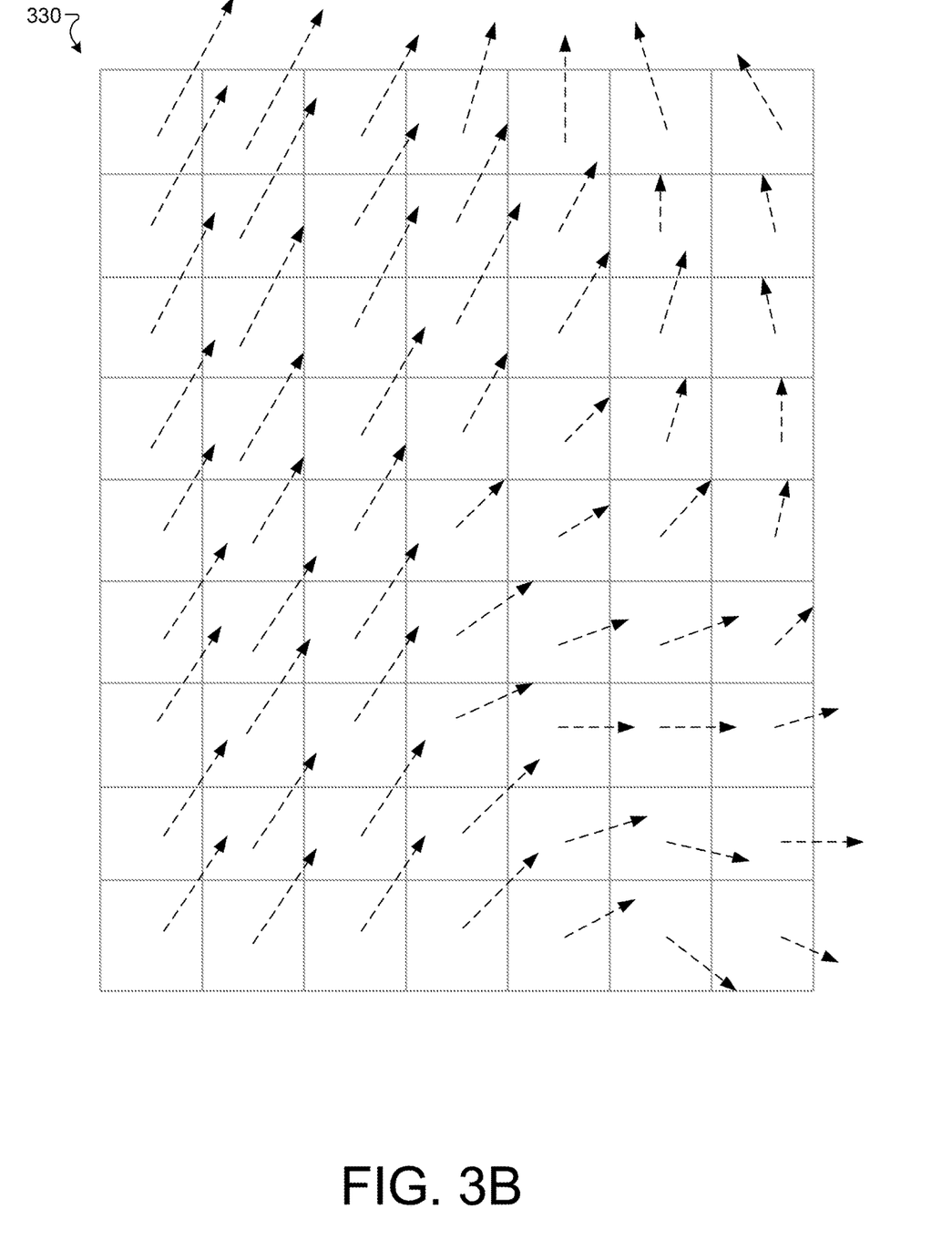
FIG. 3B is a diagram of example displacement vector map indicative of chromatic aberration that might produce the displaced images as shown in FIG. 3A.

FIG. 3B is a diagram illustrating example red-green displacement data 330. Again, it is emphasized that the displacement data 330 is independent of the color image 300 and is characteristic of chromatic aberration in the optical system 110. As illustrated in FIG. 3B, each displacement datum is a single value within a region defined by a pixel 320. In some implementations, the regions that each contain a single displacement value are different from the regions containing an image pixel 320. In such a case, the image data or the displacement data may be interpolated so that the respective regions match.

As illustrated in FIG. 3B, each displacement value is a vector having a horizontal component and a vertical component. The position of each region containing a displacement value may be analogous to a field position in an image plane of the optical system 110 (i.e., that plane in which the imaging element is placed). In the case illustrated in FIG. 3B, the displacements vary with field position although this may not always be the case, especially if transverse chromatic aberration is negligible.

Figure 4:
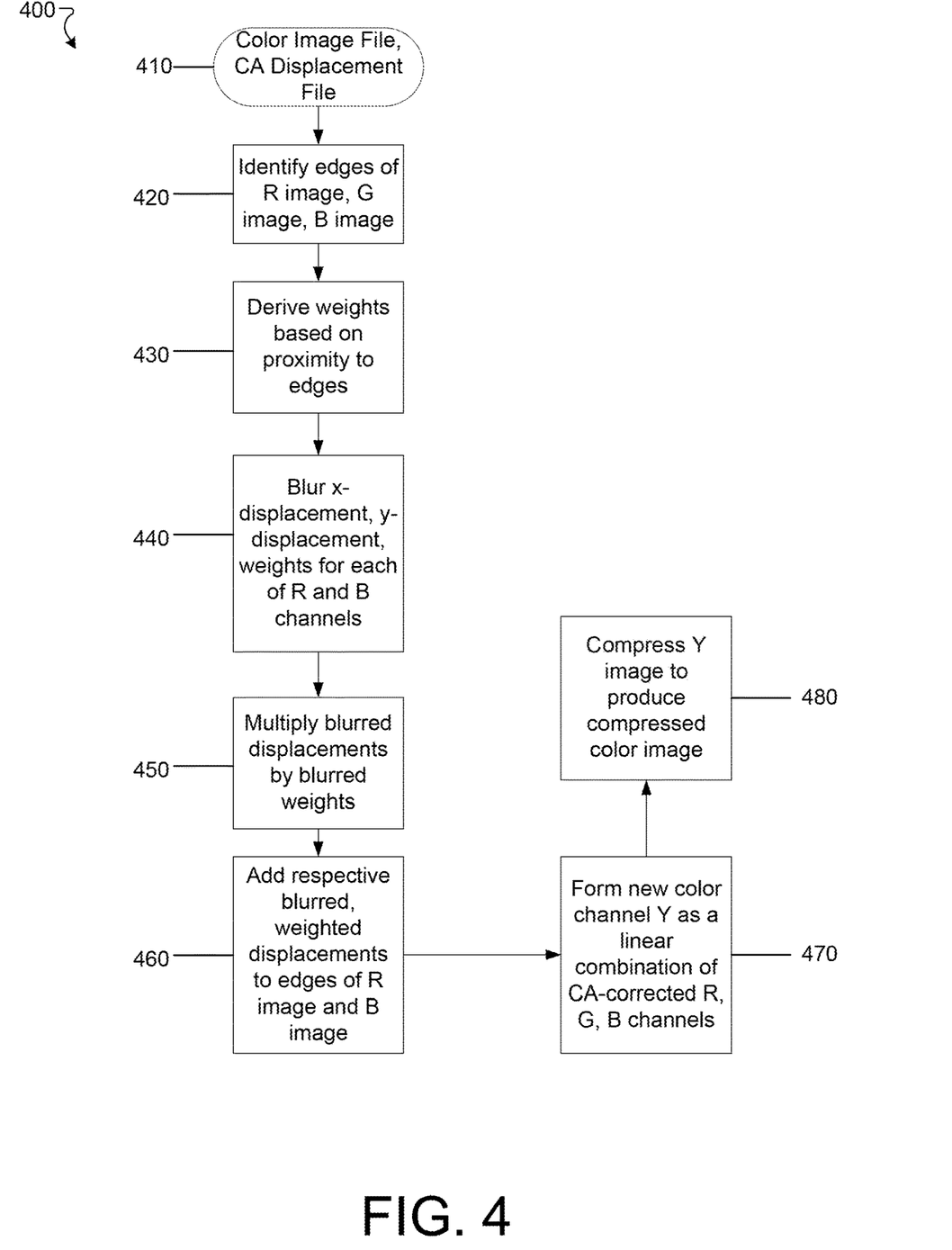
FIG. 4 is a flow chart that illustrates an example process of color image compression according to the improved techniques shown in FIG. 1.

FIG. 4 is a flow chart illustrating an example process 400 of compressing color images exhibiting chromatic aberration. The process 400 may be performed by software constructs described in connection with FIG. 1, which reside in memory 126 of the color image processing computer 120 and are run by the set of processing units 124.

At 410, the color image processing computer 120 receives a color image file that includes color image data (e.g., color image data 132 of FIG. 1) and a chromatic aberration displacement file that includes red-green displacements 142 and blue-green displacements 148. As described above, in many cases the blue-green displacements may not be necessary.

At 420, the color image processing computer 120 identifies edges of a red image, a green image, and a blue image corresponding, respectively, to red, green, and blue color channels in the color image represented by the color image data. The edge detection, or identification, may be performed using standard image processing techniques.

At 430, the color image processing computer 120 derives weight data based on the identified edges of the color image. Along these lines, the weights are based on a proximity of a region containing a pixel to an image edge—a red weight may be based on a proximity to an edge of the red image, and so on. For example, the weights may be small numbers or zero when far from an edge and close to one or one when at an edge.

At 440, the color image processing computer 120 performs a blurring or other linear or nonlinear regularization operation on the horizontal components of the green-red displacements (i.e., green red displacement map) and the green-blue displacement map, the vertical components of the green-red and blue-red displacement maps, and the edge weights. In some implementations, the blurring operation is a convolution with the above data and a blurring kernel function. In some implementations, the blurring kernel is a gaussian kernel of a specified width but this is by no means a requirement. Other blurring kernels may include a Lorentzian kernel, a windowed cosine kernel, and the like.

At 450, the color image processing computer 120 multiplies the blurred displacements of the blurred displacement maps by the blurred edge weights. Specifically, the green-red displacements are multiplied by green weights, and so on, to produce weighted, blurred displacement maps.

At 460, the color image processing computer 120 adds the displacements of the blurred, weighted displacement maps to the respective image (e.g., the blurred, weighted green-red displacement map to the green image) to produce a corrected color image. If also using the blue image, then an average of the resulting corrected images may be considered to be the corrected color image.

At 470, the color image processing computer 120 forms a new color channel Y as a linear combination of the red, green, and blue channels of the corrected color image.

At 480, the color image processing computer 120 performs a compression operation on the color image data represented by the single channel Y to produce compressed color image data.

Figure 5:
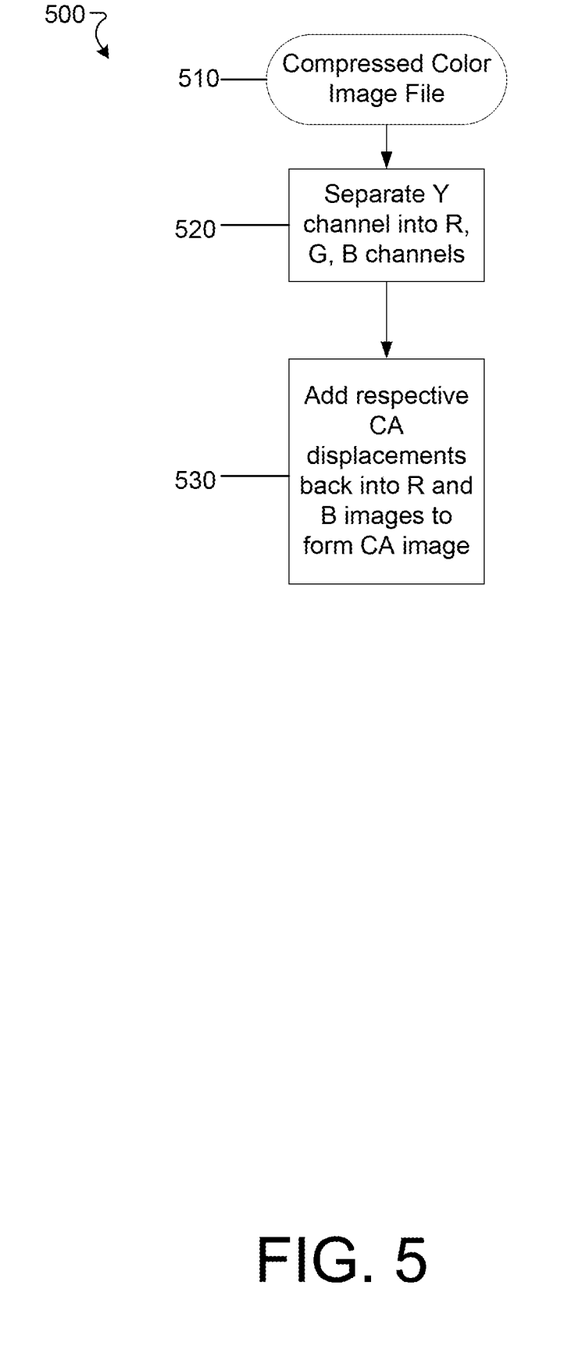
FIG. 5 is a flow chart that illustrates an example process of color image decompression according to the improved techniques shown in FIG. 1.

FIG. 5 is a flow chart illustrating an example process 500 of decompressing color images formerly exhibiting chromatic aberration. The process 500 may be performed by software constructs described in connection with FIG. 1, which reside in memory 126 of the color image processing computer 120 and are run by the set of processing units 124.

At 510, the color image processing computer 120 obtains a compressed color image file to produce color image data containing a single color channel Y that is a linear combination of a red channel, a green channel, and a blue channel.

At 520, the color image processing computer 120 separates the three color channels—the red, the green, and the blue—from the single color channel Y.

At 530, the color image processing computer 120 adds back the displacement vectors that represent the chromatic aberration of the optical system 110 back into the color image to reproduce the original color image.

Figure 6:
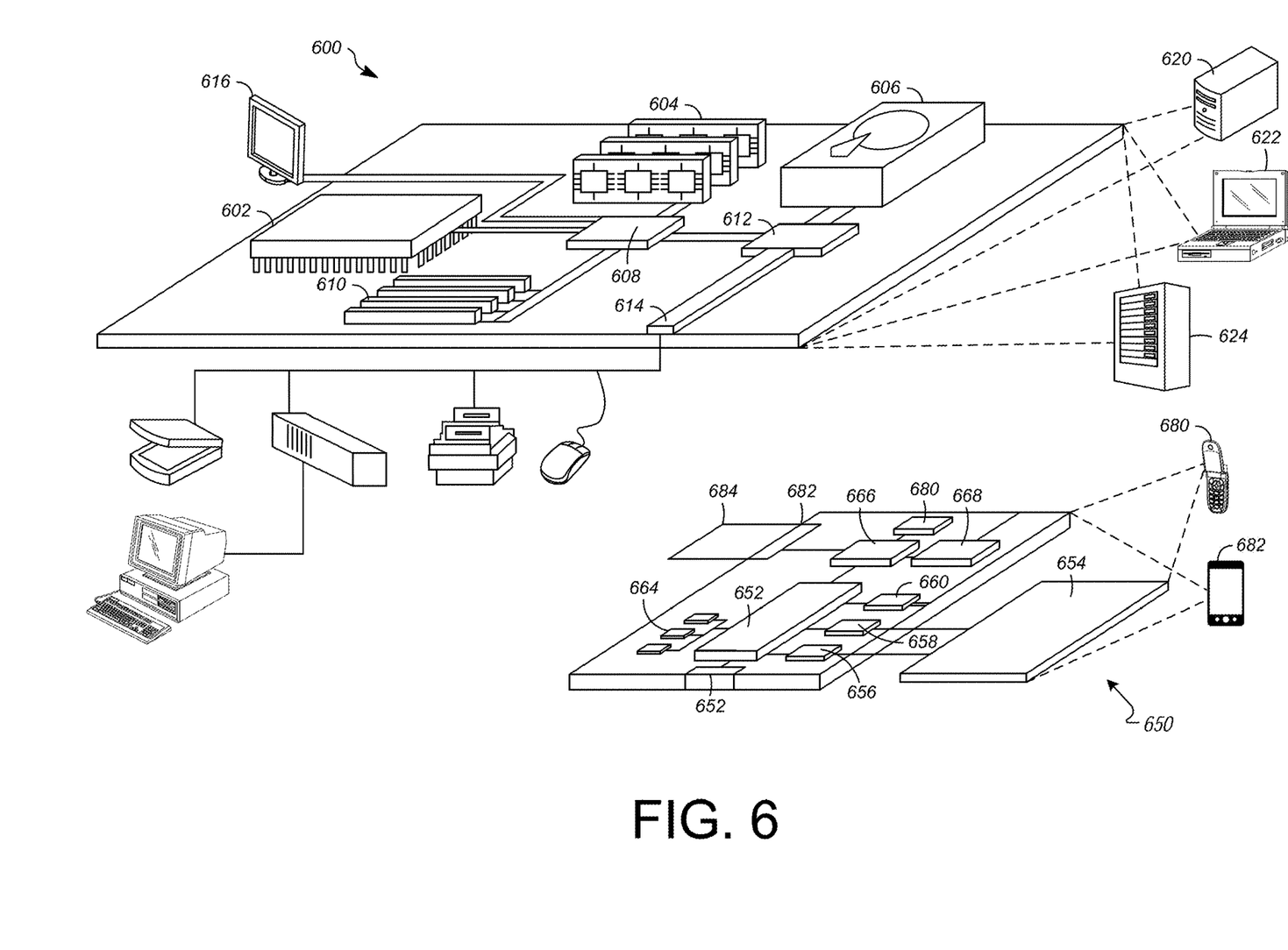
FIG. 6 illustrates an example of a computer device and a mobile computer device that can be used with circuits described here.

FIG. 6 illustrates an example of a generic computer device 600 and a generic mobile computer device 650, which may be used with the techniques described here.

As shown in FIG. 6, computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 500, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 506 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
   receiving, by image processing circuitry configured to compress color image data, color image data representing a color image from an imaging system having chromatic aberration, the color image including a first color channel and a second color channel, the first color channel forming a first image and the second color channel forming a second image, the chromatic aberration producing a separation between an edge of the first image and an edge of the second image and represented as weighted vector displacements based on proximity to the edges of the first and second images;
   performing, by the image processing circuitry, a chromatic aberration correction operation on the color image data to produce corrected color image data representing a corrected color image, the chromatic aberration correction operation being based on the chromatic aberration of the imaging system, the corrected color image having a reduced separation, based on the weighted vector displacements, between the edge of the first image and the edge of the second image; and
   performing, by the image processing circuitry, an image compression operation on the corrected color image data that is produced based on the chromatic aberration correction operation to produce compressed color image data, the compressed color image data having fewer bits of information than the corrected color image data.

2. The method as in claim 1, further comprising:
   performing a decompression operation on the compressed color image data to produce decompressed color image data; and
   performing a chromatic aberration restoration operation on the decompressed color image data to produce second color image data that is substantially the same as the color image data, the chromatic aberration restoration operation being an inverse of the chromatic aberration correction operation.

3. The method as in claim 1, wherein the color image includes, as the first color channel, a green color channel and as the second color channel, one of a red color channel and a blue color channel, the green color channel, the red color channel, and the blue color channel forming an RGB representation of a color spectrum of the color image.

4. The method as in claim 1, wherein the color image includes a plurality of pixels, each of the pixels being defined by a respective specified region of a plurality of specified regions over which each specified region of the first color channel and the second color channel has a respective constant brightness,
   wherein the method further comprises, prior to receiving the color image data and for a specified region of the plurality of specified regions, generating the weighted vector displacement between the first color channel and the second color channel within that specified region, the weighted vector displacement within that specified region being defined by the chromatic aberration of the imaging system and representing an expected displacement between the edge of the first image and the edge of second image within that specified region, and
   wherein performing the chromatic aberration correction operation on the color image data includes adding the weighted vector displacement within the specified region defining that pixel to a vector defining the edge of the second image.

5. The method as in claim 4, further comprising generating a respective weighted vector displacement between the first color channel and the second color channel within the other specified regions of the plurality of specified regions to form a weighted vector displacement map over the plurality of specified regions;
   wherein, for each weighted vector displacement of the weighted vector displacement map, the weighted vector displacement within that specified region includes a horizontal component and a vertical component to form a horizontal component map and a vertical component map, respectively, and
   wherein performing the chromatic aberration correction operation on the color image data further includes, prior to adding the weighted vector displacement within the specified region, performing a regularization operation on the horizontal component map with a horizontal smoothing kernel and performing the regularization operation on the vertical component map with a vertical smoothing kernel.

6. The method as in claim 4, wherein performing the chromatic aberration correction operation on the color image data includes, for each of the plurality of pixels of the color image:
   defining a weight within the specified region defining that pixel, the weight defined within the specified region being a number having a value indicative of a proximity of the specified region to one of the first edge of the first image and the second edge of the second image; and
   prior to adding the weighted vector displacement within the specified region defining that pixel to a vector defining the edge of the second image, forming a product of the weight defined within the specified region and the weighted vector displacement within the specified region.

7. The method as in claim 6, wherein defining the weight within the specified region defining each of the plurality of pixels produces a weight map over the plurality of specified regions, and
   wherein performing the chromatic aberration correction operation on the color image data further includes, prior to forming a product of the weight defined within the specified region and the weighted vector displacement within the specified region, performing a regularization operation on the weight map with a weight smoothing kernel.

8. A computer program product comprising a non-transitory storage medium, the computer program product including code that, when executed by processing circuitry of a sound rendering computer configured to compress color image data, causes the processing circuitry to perform a method, the method comprising:
receiving color image data representing a color image from an imaging system having chromatic aberration, the color image including a first color channel and a second color channel, the first color channel forming a first image and the second color channel forming a second image, the chromatic aberration producing a separation between an edge of the first image and an edge of the second image and represented as weighted vector displacements based on proximity to the edges of the first and second images;
performing a chromatic aberration correction operation on the color image data to produce corrected color image data representing a corrected color image, the chromatic aberration correction operation being based on the chromatic aberration of the imaging system, the corrected color image having a reduced separation, based on the weighted vector displacement, between the edge of the first image and the edge of the second image; and
performing an image compression operation on the corrected color image data that is produced based on the chromatic aberration correction operation to produce compressed color image data, the compressed color image data having fewer bits of information than the corrected color image data.

9. The computer program product as in claim 8, wherein the method further comprises:
performing a decompression operation on the compressed color image data to produce decompressed color image data; and
performing a chromatic aberration restoration operation on the decompressed color image data to produce second color image data that is substantially the same as the color image data, the chromatic aberration restoration operation being an inverse of the chromatic aberration correction operation.

10. The computer program product as in claim 8, wherein the color image includes, as the first color channel, a green color channel and as the second color channel, one of a red color channel and a blue color channel, the green color channel, the red color channel, and the blue color channel forming an RGB representation of a color spectrum of the color image.

11. The computer program product as in claim 8, wherein the color image includes a plurality of pixels, each of the pixels being defined by a respective specified region of a plurality of specified regions over which each specified region of the first color channel and the second color channel has a respective constant brightness,
wherein, prior to receiving the color image data and for a specified region of the plurality of specified regions, generating the weighted vector displacement between the first color channel and the second color channel within that specified region, the weighted vector displacement within that specified region being defined by the chromatic aberration of the imaging system and representing an expected displacement between the edge of the first image and the edge of second image within that specified region, and
wherein performing the chromatic aberration correction operation on the color image data includes adding the weighted vector displacement within the specified region defining that pixel to a vector defining the edge of the second image.

12. The computer program product as in claim 11, wherein the method further comprises generating a respective weighted vector displacement between the first color channel and the second color channel within the other specified regions of the plurality of specified regions to form a weighted vector displacement map over the plurality of specified regions;
wherein, for each weighted vector displacement of the weighted vector displacement map, the weighted vector displacement within that specified region includes a horizontal component and a vertical component to form a horizontal component map and a vertical component map, respectively, and
wherein performing the chromatic aberration correction operation on the color image data further includes, prior to adding the weighted vector displacement within the specified region, performing a regularization operation on the horizontal component map with a horizontal smoothing kernel and performing the regularization operation on the vertical component map with a vertical smoothing kernel.

13. The computer program product as in claim 11, wherein performing the chromatic aberration correction operation on the color image data includes, for each of the plurality of pixels of the color image:
defining a weight within the specified region defining that pixel, the weight defined within the specified region being a number having a value indicative of a proximity of the specified region to one of the first edge of the first image and the second edge of the second image; and
prior to adding the weighted vector displacement within the specified region defining that pixel to a vector defining the edge of the second image, forming a product of the weight defined within the specified region and the weighted vector displacement within the specified region.

14. The computer program product as in claim 13, wherein defining the weight within the specified region defining each of the plurality of pixels produces a weight map over the plurality of specified regions, and
wherein performing the chromatic aberration correction operation on the color image data further includes, prior to forming a product of the weight defined within the specified region and the weighted vector displacement within the specified region, performing a regularization operation on the weight map with a weight smoothing kernel.

15. An electronic apparatus configured to compress color images, the electronic apparatus comprising:
memory; and
controlling circuitry coupled to the memory, the controlling circuitry being configured to:
receive color image data representing a color image from an imaging system having chromatic aberration, the color image including a first color channel and a second color channel, the first color channel forming a first image and the second color channel forming a second image, the chromatic aberration producing a separation between an edge of the first image and an edge of the second image and represented as weighted vector displacements based on proximity to the edges of the first and second image;

perform a chromatic aberration correction operation on the color image data to produce corrected color image data representing a corrected color image, the chromatic aberration correction operation being based on the chromatic aberration of the imaging system, the corrected color image having a reduced separation, based on the weighted vector displacement, between the edge of the first image and the edge of the second image; and perform an image compression operation on the corrected color image data that is produced based on the chromatic aberration correction operation to produce compressed color image data, the compressed color image data having fewer bits of information than the corrected color image data.

16. The electronic apparatus as in claim 15, wherein the controlling circuitry is further configured to:

perform a decompression operation on the compressed color image data to produce decompressed color image data; and perform a chromatic aberration restoration operation on the decompressed color image data to produce second color image data that is substantially the same as the color image data, the chromatic aberration restoration operation being an inverse of the chromatic aberration correction operation.

17. The electronic apparatus as in claim 15, wherein the color image includes, as the first color channel, a green color channel and as the second color channel, one of a red color channel and a blue color channel, the green color channel, the red color channel, and the blue color channel forming an RGB representation of a color spectrum of the color image.

18. The electronic apparatus as in claim 15, wherein the color image includes a plurality of pixels, each of the pixels being defined by a respective specified region of a plurality of specified regions over which each specified region of the first color channel and the second color channel has a respective constant brightness, wherein the controlling circuitry is further configured to, prior to receiving the color image data and for a specified region of the plurality of specified regions, generate a weighted vector displacement between the first color channel and the second color channel within that specified region, the weighted vector displacement within that specified region being defined by the chromatic aberration of the imaging system and representing an expected displacement between the edge of the first image and the edge of second image within that specified region, and wherein the controlling circuitry configured to perform the chromatic aberration correction operation on the color image data is further configured to add the weighted vector displacement within the specified region defining that pixel to a vector defining the edge of the second image.

19. The electronic apparatus as in claim 18, wherein the controlling circuitry is further configured to generate a respective weighted vector displacement between the first color channel and the second color channel within the other specified regions of the plurality of specified regions to form a weighted vector displacement map over the plurality of specified regions;

wherein, for each weighted vector displacement of the weighted vector displacement map, the weighted vector displacement within that specified region includes a horizontal component and a vertical component to form a horizontal component map and a vertical component map, respectively, and wherein the controlling circuitry configured to perform the chromatic aberration correction operation on the color image data is further configured to, prior to adding the weighted vector displacement within the specified region, perform a regularization operation on the horizontal component map with a horizontal smoothing kernel and performing the regularization operation on the vertical component map with a vertical smoothing kernel.

20. The electronic apparatus as in claim 18, wherein the controlling circuitry configured to perform the chromatic aberration correction operation on the color image data is further configured to, for each of the plurality of pixels of the color image:

define a weight within the specified region defining that pixel, the weight defined within the specified region being a number having a value indicative of a proximity of the specified region to one of the first edge of the first image and the second edge of the second image; and prior to adding the weighted vector displacement within the specified region defining that pixel to a vector defining the edge of the second image, form a product of the weight defined within the specified region and the weighted vector displacement within the specified region.

* * * * *